Jan. 11, 1949.  N. M. NESSET ET AL  2,458,722
TUBING SET
Filed Nov. 2, 1942

Inventor:
Maurice M. Nesset
and Edward J. Nawoj;
By Dawson, Ooms and Bortt
Attorneys.

Patented Jan. 11, 1949

2,458,722

UNITED STATES PATENT OFFICE 2,458,722

TUBING SET

Naurice M. Nesset, Glenview, and Edward J. Nawoj, Chicago, Ill., assignors to Baxter Laboratories, Inc., Glenview, Ill., a corporation of Delaware Application November 2, 1942, Serial No. 464,300

9 Claims. (Cl. 285—84)

This invention relates to a tubing set, and more particularly to a joint or junction between glass tubing and flexible, collapsible, substantially inelastic tubing wherein the joint is watertight and the tubing may be readily sterilized and maintained in sterile condition.

An object of the invention is to attach flexible, collapsible, substantially inelastic tubing, such as Cellophane or the like, to glass tubing and to form a watertight joint which may be rendered sterile and maintained in such condition. Another object is to provide means for securing sterile tubing, which is substantially inelastic, to rigid glass or other tubing to form a watertight joint.

Yet another object of the invention is to provide a tubing set in which glass or other rigid tubing is securely attached to tubing of an organic derivative of cellulose composition, such as Cellophane or the like.

Other features and advantages will appear from the following specification and drawings, in which—

Figure 1:
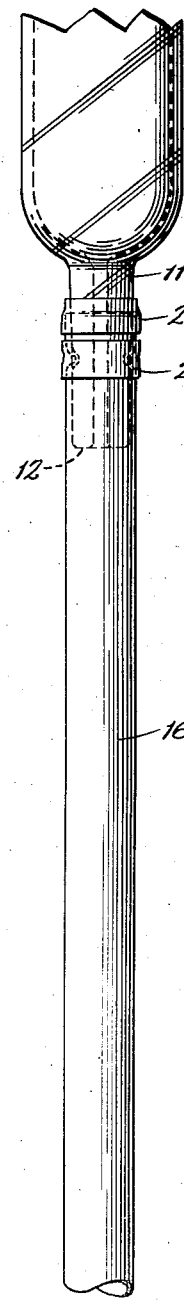
Figure 2:
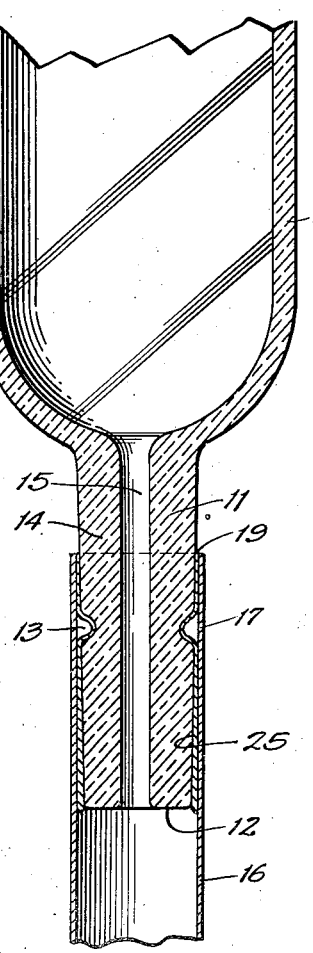
Figure 3:
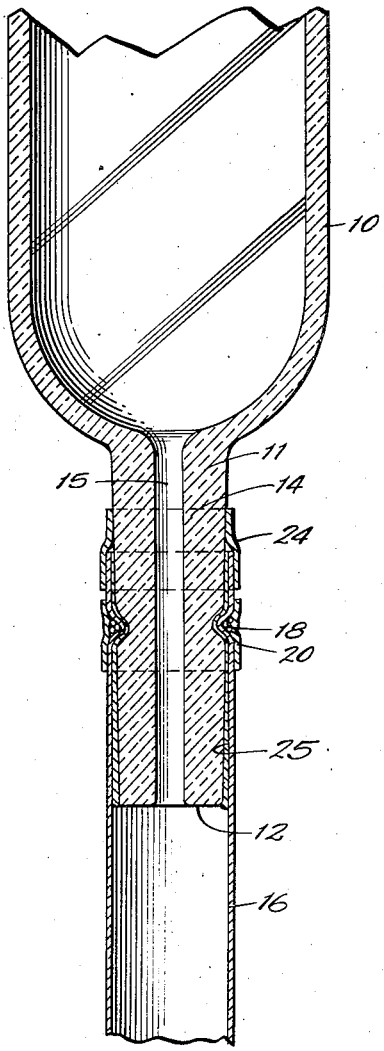
Figure 4:
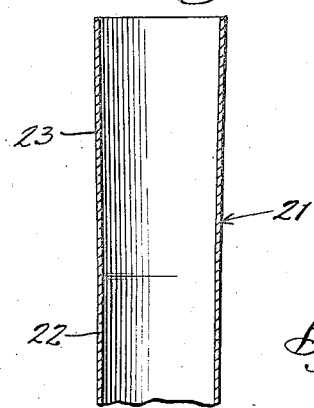

Fig. 1 is a side elevational view of the tubing set; Fig. 2 is a fragmentary detail longitudinal sectional view of the tubing set with the flexible tubing about to be secured in position on the glass tubing; Fig. 3 is a similar fragmentary detail longitudinal sectional view of the tubing set with the flexible tubing securely attached to the glass tubing; and Fig. 4 is a longitudinal sectional view of the flexible tubing having an outwardly tapered end portion.

In the use of tubing sets where sterility is of importance, as in equipment for blood transfusion or for the handling of intravenous solutions, it has heretofore been the practice to use rubber tubing which may be placed on glass tubing or glass equipment. Both the glass and rubber may be readily sterilized and maintained in sterile condition and a watertight joint between the rubber and glass is maintained. By reason of the elasticity of the rubber tubing, a watertight joint may be formed by merely passing the rubber tubing over a nipple on the end of the glass tubing.

Where rubber tubing is not available for this purpose, the problem of providing sterile flexible tubing which may be attached to glass to form a waterproof joint is a difficult one. Such materials as the organic derivatives of cellulose compositions in the form of tubing may be readily sterilized and maintained in sterile condition. However, in the case of tubing made of Cellophane or other organic derivatives of cellulose composition, it is extremely difficult to securely attach the tubing to glass to form a watertight joint. If cement or adhesive is used for this purpose, the joint which is formed (of itself) will not satisfactorily withstand the strains to which it is normally subjected in use.

The present invention contemplates attaching flexible, substantially inelastic tubing to glass tubing by means of a joint which will withstand severe strains and which is watertight. The tubing set of the invention may be readily sterilized and maintained in sterile condition.

In the embodiment of the invention described herein, a glass tube 10 is provided with a reduced end 11. The reduced end 11 of the glass tube 10 tapers slightly inwardly toward the end 12 of the tube. An annular groove 13 extends transversely about an intermediate portion of the tapered end 11 of the tube 10.

The taper of the end portion 11 of the tube 10 is slight and is substantially uniform throughout at least the major portion of the end portion. As illustrated, the taper is substantially uniform throughout the length of the end portion 11.

The glass tube is preferably equipped at the end portion 11 with a thick wall 14 and a narrow passage 15 extending therethrough. The outer surface of the end portion 11 of the tube 10 may be circular in cross section shape and is substantially smooth except for the annular groove 13 therein.

A tube 16 of Cellophane or the like is adapted to be received on the tapered end of the glass tube 10. The tube 16 may be substantially waterproof and is flexible and collapsible. The tube is readily sterilized and may be easily maintained in sterile condition. The Cellophane tube 16 may be of substantially uniform diameter throughout. The internal diameter of the tubing should be substantially the same as the external diameter of the end 11 of the glass tube 10 at the portion 19 adjacent the groove 13. The Cellophane tube 16 may be placed on the end 11 of the glass tube 10 and pressed on the glass tube until the end of the Cellophane tube reaches the portion 19 of the glass tube 10.

The tube 10 may be of any suitable type and may, in fact, be of any suitable rigid material. Thus, instead of being made of glass, the tube 10 may be made of metal or of a resinous material, such as a condensation or polymerization product. In the case of resinous materials, the material is preferably one which is transparent or translucent. For the purpose of this invention, the construction of the main body of the glass tube is immaterial and is therefore not shown or described herein. In fact, the tube 10, if desired, may be only a projecting portion of other equipment.

The tube 10 may be made of any suitable material, but should be flexible and readily sterilized and maintained in sterile condition. Normally, such tubing will also be readily collapsible. The material of which the tube 16 may be composed includes organic derivatives of cellulose composition, such as Cellophane which consists of viscose or regenerated cellulose, or cellulose acetate or other organic esters of cellulose, or cellulose ethers. Examples of such organic esters of cellulose are cellulose formate, cellulose propionate, and cellulose butyrate, while examples of cellulose ethers are ethyl cellulose, methyl cellulose, and benzyl cellulose. Other suitable material, such as resinous condensation or polymerization products, may also be used in the tube 16.

The material of the tube 16 is preferably substantially waterproof so that water solutions may be readily passed through the tubing without substantial loss or leakage. In the case of the thin Cellophane tube 16, the tube will satisfactorily carry without substantial loss or leakage a water solution, provided that in use of hydrostatic head of pressure on the inside of the tubing is only moderate. It will be understood that the term "substantially waterproof" is intended to cover such tubing as the Cellophane tubing through which a water solution may be passed without substantial loss or leakage.

When the Cellophane tubing 16 is placed on the tapered end 11 of the glass tube 10, a suitable sealing material, such as a strip of tape 24, may be wrapped transversely about the tubing overlapping the end of the Cellophane tubing 16 and the adjacent portion of the glass tube 10, as illustrated in Fig. 3. The tape 24 may be a pressure-aggressive, non-fibrous, transparent tape of the conventional type wherein the adhesive consists of a resinous or rubber base, or a mixture of the two, and provides a watertight seal between the Cellophane tubing 16 and the glass tube 10. Any other suitable material for providing a watertight seal between the Cellophane and glass tubing may be used.

If desired, a layer of a suitable sealing material may be placed on the outer surface of the tapered end 11 of the glass tube 10 to aid in forming a waterproof seal between the glass tube and the Cellophane tubing 16. This layer of sealing material may be applied to the glass tube before the Cellophane tubing 16 is placed in position thereon. The Cellophane tube 16 may be placed in position over the layer of sealing material and may then be secured in such position by fastening a cord 18 about the same at the portion thereof overlying the groove 13. The tightening of the cord 18 causes the flexible tube 16 to be drawn into the groove 13, and the secure attachment of the cord 18 in this position secures the tube 16 against longitudinal movement with respect to the glass tube.

Any suitable type of sealing material may be used for the adhesive layer 25. Preferably, the material is flexible and slightly plastic and, when disposed between the Cellophane tube and glass tube, provides a liquid-tight seal therebetween. Resinous materials in suitable organic solvents have been found to be satisfactory for this purpose. If desired, a conventional plasticizing agent may be incorporated in the material. As an example of the sealing material, cellulose acetate may be dissolved in acetone and mixed with a small quantity of a plasticizing agent.

If desired, both the tape 24 and the layer of sealing material 25 may be used in forming the watertight seal. However, either of these sealing means may be eliminated. Preferably, the tape seal is used in any event.

With this construction, the Cellophane tube 16 and the glass tube 10 are joined in watertight relation, and the use of the cord 18 in the groove 13 securely attaches the Cellophane tube to the glass tube. Strains to which the joint may be subjected do not effect the seal since the glass and Cellophane tubing cannot be moved longitudinally with respect to each other.

Any suitable means may be used for securing the cellophane tube with the groove 13 in the glass tube. However, a filamentary material, such as thread or the cord 18, has been found to be satisfactory for this purpose.

After applying the cord 18 to the tube 16, a strip of tape 20 may be placed about the cord 18 and tube 16 overlying the groove 13 which receives the cord.

If desired, the Cellophane tube, as illustrated in Fig. 4, may be outwardly tapered near the end thereof, the taper being substantially the same as the inward taper on the end 11 of the glass tube. In this event, the body portion 22 of the tube 21 may be substantially uniform in diameter, the diameter of the body portion 22 being the same as that of the end of the glass tube. The end portion 23 is outwardly tapered and is adapted to be received on the end 11 of the glass tube 10. In the case of this construction, the tubing 21 is placed over the end 11 of the glass tube and is pressed on the glass tube until it tightly engages the same. A suitable layer of sealing material may be placed between the Cellophane tube 21 and the end 11 of the glass tube 10.

The end 11 of the glass tube 10 and the end portion 17 of the Cellophane tube 16 should be of substantially the same cross section shape so that the Cellophane tube 16 will fit snugly about the end 11 of the glass tube 10. The shape is preferably tubular and, as illustrated, both tubes may be substantially circular in cross section. However, the cross section shape may be of any tubular form in which substantially all portions of the cross sectional periphery are arcuate in contour.

Although the invention has been described in connection with specific embodiments, it will be understood that such description is for the purpose of illustration only. Changes and modifications, therefore, may be readily made without departing from the spirit and scope of the invention.

We claim:

1. A tubing set for transmitting liquids, comprising a rigid tube having a groove extending transversely about the periphery of an intermediate portion of the end thereof and a thin flexible, substantially inelastic tube received snugly about said end of the rigid tube and overlying the groove therein, the end of said rigid tube having a longitudinal dimensionally constant peripheral surface extending thereabout adjacent said groove, receiving the inelastic tube in snug peripheral engagement therewith and means extending transversely about said inelastic tube and overlying said groove to secure the inelastic tube within the groove and prevent longitudinal movement of the tubes with respect to each other.

2. A tubing set for transmitting liquids, comprising a glass tube having at one end a slight narrowing taper toward the end thereof, said tube having a groove extending transversely about the periphery of an intermediate portion of the tapered end, and a thin, flexible, collapsible, substantially waterproof and inelastic tube of internal diameter substantially the same as the external diameter of said tapered end adjacent said groove received snugly about said tapered end of the glass tube and overlying the groove therein, the end of said rigid tube having a longitudinal dimensionally constant peripheral surface extending thereabout adjacent said groove, receiving the inelastic tube in snug peripheral engagement therewith and means extending transversely about said inelastic tube and overlying said groove in said glass tube to secure the inelastic tube within the groove and prevent longitudinal movement of the tubes with respect to each other.

3. A tubing set for transmitting liquids, comprising a glass tube having at one end a narrowing taper toward the end thereof, said tube having a groove extending transversely about the periphery of an intermediate portion of the tapered end, a thin, flexible, collapsible, substantially waterproof and inelastic tube received snugly about said tapered end of the glass tube and overlying the groove therein, the end of said rigid tube having a longitudinal dimensionally constant peripheral surface extending thereabout adjacent said groove, receiving the inelastic tube in snug peripheral engagement therewith a sealing material providing a substantially watertight seal between said tubes, and means extending transversely about said inelastic tube and overlying the groove in said glass tube to secure the inelastic tube within the groove and prevent longitudinal movement of the tubes with respect to each other.

4. A tubing set for transmitting liquids, comprising a glass tube having at one end a slight narrowing uniform taper toward the end thereof, said tube having a groove extending transversely about the periphery of an intermediate portion of the tapered end, a thin, flexible, collapsible, substantially waterproof and inelastic tube of internal diameter substantially the same as the external diameter of said tapered end adjacent the groove therein received snugly about said tapered end of the glass tube, the end of said rigid tube having a longitudinal dimensionally constant peripheral surface extending thereabout adjacent said groove, receiving the inelastic tube in snug peripheral engagement therewith a sealing material providing a watertight seal between said tubes, and filamentary means extending transversely about said inelastic tube and overlying said groove to secure the inelastic tube within the groove and prevent longitudinal movement of the tubes with respect to each other.

5. A tubing set for transmitting liquids, comprising a glass tube having at one end a narrowing taper toward the end thereof, said tubing having a groove extending transversely about the periphery of an intermediate portion of the tapered end, and a thin, flexible, collapsible, substantially waterproof and inelastic tube of an organic derivative of cellulose composition received snugly about said tapered end of the glass tube and overlying the groove therein, the end of said rigid tube having a longitudinal dimensionally constant peripheral surface extending thereabout adjacent said groove, receiving the inelastic tube in snug periperal engagement therewith and means extending transversely about said inelastic tube and overlying said groove to secure said inelastic tube within the groove and prevent longitudinal movement of the tubes with respect to each other.

6. A tubing set for transmitting liquids, comprising a glass tube having at one end a slight narrowing uniform taper toward the end thereof, said tube having a groove extending transversely about the periphery of an intermediate portion of the tapered end, a thin Cellophane tube of a substantially uniform diameter, the internal diameter being substantially the same as the external diameter of said tapered end adjacent said groove, said Cellophane tube being received snugly about said tapered end of the glass tube, the end of said rigid tube having a longitudinal dimensionally constant peripheral surface extending thereabout adjacent said groove, receiving the inelastic tube in snug peripheral engagement therewith a strip of sealing tape extending about the junction between said tubes providing a substantially watertight joint therebetween, and filamentary means extending transversely about said inelastic tube and overlying the groove therein to secure the inelastic tube within said groove and prevent longitudinal movement of the tubes with respect to each other.

7. A tubing set for transmitting liquids, comprising a glass tube having at one end a slight narrowing uniform taper toward the end thereof, said tube having a groove extending transversely about the periphery of an intermediate portion of the tapered end, a thin Cellophane tube having a slight outward taper at one end thereof, the body of the Cellophane tube being of an internal diameter substantially the same as the external diameter of the end of the glass tube adjacent said groove and the tapered portion of the Cellophane tube having a taper substantially the same as the taper on the end of the glass tube, the end of said rigid tube having a longitudinal dimensionally constant peripheral surface extending thereabout adjacent said groove, receiving the inelastic tube in snug peripheral engagement therewith, the tapered portion of the Cellophane tube being snugly received about the tapered end of the glass tube and overlying the groove therein, a sealing material between the tapered ends of said tubes for securing a water-tight seal therebetween, and a cord extending transversely about said Cellophane tube and overlying said groove, said cord being drawn tight to secure the Cellophane tube within the groove and prevent longitudinal movement of the tubes with respect to each other.

8. A tubing set for transmitting liquids, comprising a glass tube having at one end a narrowing taper toward the end thereof, said tube having a groove extending transversely about the periphery of an intermediate portion of the tapered end, a thin, flexible, collapsible, substantially waterproof and inelastic tube received snugly about said tapered end of the glass tube and overlying the groove therein, the end of said glass tube having a longitudinal, dimensionally, constant peripheral surface extending thereabout adjacent said groove receiving the inelastic tube in snug peripheral engagement therewith, a sealing material providing a substantially watertight seal between the tubes, means extending transversely about said inelastic tube and overlying the groove in said glass tube to secure the inelastic tube within the groove and prevent longitudinal movement of the tubes with respect to each other, and tape means adhesively connecting portions of the inelastic tube adjacent that secured within the groove to prevent longitudinal forces from effecting displacement of that portion secured within the groove.

9. A tubing set for transmitting liquids, comprising a glass tube having at one end a slight narrowing uniform taper toward the end thereof, said tube having a groove extending transversely to the periphery of an intermediate portion of the tapered end, a thin Cellophane tube having a slight outward taper at one end thereof, the body of the Cellophane tube being of a uniform internal diameter substantially the same as the external diameter of the end of the glass tube adjacent said groove and the tapered portion of the Cellophane having a taper substantially the same as the taper of the end of the glass tube, the end of said glass tube having a longitudinal, dimensionally constant peripheral surface extending thereabout adjacent said groove receiving the Cellophane tube in snug peripheral engagement therewith, the tapered portion of the Cellophane tube being snugly received to the tapered end of the glass tube and overlying the groove therein, sealing material between the tapered ends of said tubes for securing a watertight seal there-between, a cord extending transversely about said Cellophane tube and overlying said groove, said cord being drawn tight to secure the Cellophane tube within the groove and prevent longitudinal movement of the tubes with respect to each other and a binding tape extending transversely about said Cellophane tube to connect the tube in the regions adjacent that secured within the groove causing the tube to retain the rib-like relation seated within the groove.

NAURICE M. NESSET.
EDWARD J. NAWOJ.

REFERENCES CITED

The following references are of record in the file of this patent:

UNITED STATES PATENTS

| Number | Name | Date |
|---|---|---|
| 50,398 | Smith | Oct. 10, 1865 |
| 144,163 | Taylor | Oct. 28, 1873 |
| 796,114 | Currey | Aug. 1, 1905 |
| 1,067,202 | Stacey | July 8, 1913 |
| 1,251,086 | Morgan | Dec. 25, 1917 |
| 1,678,640 | Hall | July 31, 1928 |
| 2,014,441 | Matthews | Sept. 17, 1935 |
| 2,143,279 | Osborn | Jan. 10, 1939 |
| 2,198,996 | Guarnaschell | Apr. 30, 1940 |
| 2,237,221 | Flynn | Apr. 1, 1941 |